United States Patent
Kimura et al.

(10) Patent No.: US 8,547,195 B2
(45) Date of Patent: Oct. 1, 2013

(54) PROTECTIVE ELEMENT AND SECONDARY BATTERY DEVICE

(75) Inventors: Yuji Kimura, Nomi (JP); Takahiro Asada, Nomi (JP); Yoshihiro Yoneda, Nomi (JP); Kazuaki Suzuki, Nomi (JP)

(73) Assignee: Dexerials Corporation, Tokyo (JP)

( * ) Notice: Subject to any disclaimer, the term of this patent is extended or adjusted under 35 U.S.C. 154(b) by 135 days.

(21) Appl. No.: 12/677,492

(22) PCT Filed: May 14, 2009

(86) PCT No.: PCT/JP2009/059006
§ 371 (c)(1),
(2), (4) Date: Mar. 10, 2010

(87) PCT Pub. No.: WO2009/142141
PCT Pub. Date: Nov. 26, 2009

(65) Prior Publication Data
US 2011/0012704 A1    Jan. 20, 2011

(30) Foreign Application Priority Data

May 23, 2008 (JP) .................................. 2008-135725
Oct. 21, 2008 (JP) .................................. 2008-270833

(51) Int. Cl.
*H01H 85/20* (2006.01)
*H01H 85/04* (2006.01)
*H01H 37/76* (2006.01)
*H01H 69/02* (2006.01)
*H02H 5/04* (2006.01)

(52) U.S. Cl.
USPC ........... 337/186; 337/267; 337/398; 337/416; 361/104; 29/623

(58) Field of Classification Search
USPC ........... 337/168, 186, 297, 416, 398; 29/623; 361/104
See application file for complete search history.

(56) References Cited

U.S. PATENT DOCUMENTS

| 3,354,282 A | * | 11/1967 | Batsch ........................... 337/234 |
| 3,386,063 A | * | 5/1968 | Mansfield, Jr. ................ 337/191 |

(Continued)

FOREIGN PATENT DOCUMENTS

| JP | 7-230748 A | 8/1995 |
| JP | 08-007731 | 1/1996 |

(Continued)

OTHER PUBLICATIONS

English Language International Search Report dated Jun. 9, 2009 issued in parent Appln. No. PCT/JP2009/059006.

(Continued)

*Primary Examiner* — Bradley Thomas
(74) *Attorney, Agent, or Firm* — Holtz, Holtz, Goodman & Chick, PC

(57) ABSTRACT

A protection element and a secondary battery device employing the protection element are provided for stably retaining a flux on a soluble conductor at a predetermined position, so as to enable appropriate blowout of the soluble conductor in the event of an abnormality. The protection element has a soluble conductor which is disposed on an insulation baseboard, and which is connected to a power supply path of a device targeted to be protected, and which causes a blowout when a predetermined abnormal electric power amount is supplied. A flux is coated on a surface of the soluble conductor, and an insulation cover member is mounted on the baseboard and covers the soluble conductor. The protection element also includes a stepped portion for retaining the flux at a predetermined position in contact with the flux, and the stepped portion is formed opposite to the soluble conductor on an interior face of the insulation cover member.

10 Claims, 14 Drawing Sheets

(56) References Cited

U.S. PATENT DOCUMENTS

| | | | |
|---|---|---|---|
| 4,198,617 A * | 4/1980 | Hara | 337/403 |
| 4,494,104 A * | 1/1985 | Holmes | 337/403 |
| 5,097,247 A * | 3/1992 | Doerrwaechter | 337/405 |
| 5,497,286 A * | 3/1996 | Shimada et al. | 361/105 |
| 5,631,621 A * | 5/1997 | Nakajima | 337/280 |
| 5,659,284 A * | 8/1997 | Olofsson | 337/290 |
| 5,712,610 A * | 1/1998 | Takeichi et al. | 337/290 |
| 5,760,676 A * | 6/1998 | Yamada | 338/22 R |
| 5,781,095 A * | 7/1998 | Dietsch et al. | 337/243 |
| 5,821,849 A * | 10/1998 | Dietsch et al. | 337/241 |
| 6,040,754 A * | 3/2000 | Kawanishi | 337/297 |
| 6,169,472 B1 * | 1/2001 | Kahr | 338/22 R |
| 6,198,376 B1 * | 3/2001 | Ishikawa et al. | 337/297 |
| 6,222,438 B1 * | 4/2001 | Horibe et al. | 337/290 |
| 6,373,371 B1 * | 4/2002 | Doerrwaechter et al. | 337/297 |
| 6,452,475 B1 * | 9/2002 | Kawazu et al. | 337/290 |
| 7,042,327 B2 * | 5/2006 | Tanaka et al. | 337/290 |
| 7,742,269 B2 * | 6/2010 | Shinohara | 361/103 |
| 2002/0014945 A1 * | 2/2002 | Furuuchi et al. | 337/158 |
| 2002/0113685 A1 * | 8/2002 | Izaki et al. | 337/405 |
| 2004/0070486 A1 * | 4/2004 | Senda et al. | 337/405 |
| 2004/0085178 A1 * | 5/2004 | Tanaka et al. | 337/159 |
| 2004/0100352 A1 * | 5/2004 | Tanaka | 337/159 |
| 2004/0174243 A1 * | 9/2004 | Tanaka | 337/159 |
| 2004/0196133 A1 * | 10/2004 | Kawanishi | 337/159 |
| 2005/0001710 A1 * | 1/2005 | Mukai et al. | 337/297 |
| 2005/0007233 A1 * | 1/2005 | Tanaka | 337/159 |
| 2005/0035841 A1 * | 2/2005 | Kobayashi et al. | 337/157 |
| 2005/0140491 A1 * | 6/2005 | Uehara et al. | 337/401 |
| 2005/0264394 A1 * | 12/2005 | Furuuchi | 337/182 |
| 2006/0097839 A1 * | 5/2006 | Tanaka | 337/159 |
| 2007/0013472 A1 * | 1/2007 | Kobayashi et al. | 337/159 |
| 2007/0024407 A1 * | 2/2007 | Senda et al. | 337/159 |
| 2010/0085141 A1 * | 4/2010 | Knab et al. | 337/227 |
| 2010/0109833 A1 * | 5/2010 | Knab et al. | 337/413 |
| 2011/0181385 A1 * | 7/2011 | Schulze-Icking-Konert et al. | 337/290 |

FOREIGN PATENT DOCUMENTS

| | | |
|---|---|---|
| JP | 2001-043783 A | 2/2001 |
| JP | 2004-039576 A | 2/2004 |
| JP | 2004-265617 A | 9/2004 |
| JP | 2007-294117 A | 11/2007 |

OTHER PUBLICATIONS

International Preliminary Report on Patentability (IPRP) dated Dec. 2, 2010 (and English translation thereof) in parent International Application No. PCT/JP2009/059006.

Chinese Office Action dated Dec. 14, 2012 (and English translation thereof) in counterpart Chinese Application No. 200980100003.X.

* cited by examiner

US 8,547,195 B2

PROTECTIVE ELEMENT AND SECONDARY BATTERY DEVICE

This application is a U.S. National Phase Application under 35 USC 371 of International Application PCT/JP2009/059006 filed May 14, 2009.

TECHNICAL FIELD

This invention relates to a protection element and a secondary battery device employing the protection element for, in case that an overcurrent or overvoltage is applied, allowing a soluble conductor to cause a blowout due to a heat of such overcurrent or overvoltage, thereby shutting off a current.

BACKGROUND ART

Conventionally, a protection element mounted on a secondary battery device or the like is employed as the one having a function of protection from an overvoltage as well as an overcurrent. This protection element is formed so that: a heating element and a soluble conductor made of a low-melting metal are laminated on a board; and the soluble conductor causes a blowout due to an overcurrent, and if an overvoltage occurs as well, power is supplied to the heating element in the protection element, and the soluble conductor causes a blowout due to a heat of the heating element. The blowout of the soluble conductor is due to the goodness of wettability relative to a surface of a connected electrode at the time of blowout of the soluble conductor which is the low-melting metal; the blown low-melting metal is gravitated onto the electrode; and as a result, the soluble conductor is brown out, and a current is shut off.

On the other hand, with downsizing of electronic devices such as portable devices in recent years, there has been a need for downsizing/thinning of the protection element of this type. Further, there has been a demand for the stability and fastness of its operation. As a means thereof, a soluble conductor of a low-melting metal is disposed on an insulation board, and is sealed with an insulation cover member; and the soluble conductor is coated with a flux. This flux is provided so as to prevent oxidization of a surface of the soluble conductor, and at the time of heating of the soluble conductor, to speedily and stably fuse it.

Such protection element has a structure shown in FIG. 28. In this protection element, a soluble conductor 3 made of a low-melting metal is provided between a pair of electrodes 2, which are formed on both ends of a baseboard 1, and an insulation cover member 4 is provided facing the soluble conductor 3 on the baseboard 1. Further, on the baseboard 1 of this protection element, a pair of electrodes 2, although not shown, are further provided at an opposite edge part orthogonal to the pair of electrodes 2, and a heating element 5 made of a resistor therebetween is provided. The heating element 5 is laminated in proximity to the soluble conductor 3 via an insulation layer 6 and a conductor 7. In addition, the cover member 4 which is mounted on the baseboard 1 is covered forming a predetermined space 8 relative to the soluble conductor 3. Further, the soluble conductor 3 is coated with a flux 9, and the flux 9 is accommodated in this space 8.

In addition, a protection element of which a soluble conductor is sealed with an insulation cover member has a structure disclosed in Patent Document 1. In this protection element, since a space in which a fused metal gathers on an electrode at the time of blowout of the soluble conductor is reduced due to thinning thereof, a metal pattern is provided at a site facing each electrode on an interior face of an insulation cover plate, in order to ensure gravitation of the fused metal to each electrode portion.

Further, as disclosed in Patent Document 2, there is proposed the one in which: in order to prevent dispersion of an operating temperature, a piece of soluble alloy is coated with a flux; and a groove or a glass belt, for preventing the spread wetting of the fused alloy, is provided at the periphery of an electrode to which a soluble alloy is connected.

DOCUMENTS OF PRIOR ART

Patent Documents

Patent Document 1: Japanese Patent Application Laid-open No. 2004-265617
Patent Document 2: Japanese Patent Application Laid-open No. 2007-294117

SUMMARY OF THE INVENTION

Problem(s) to Be Solved by the Invention

In the aforementioned one shown in FIG. 28 or in the protection elements disclosed in Patent Document 1 and 2, a flux acts as an activator for anti-oxidization of a soluble conductor and for blowout at an abnormal current or voltage, and a retention state of the flux has influenced an operating velocity. In particular, if a halogen-free flux not containing a halogen component such as bromine (Br) is used in order to mitigate an environmental load, the flux of this type is low in degree of activity, and the state of the flux has greatly influenced the blowout velocity of the soluble conductor.

In other words, as shown in FIG. 29, in the insulation cover member 4, a flux 9 on the soluble conductor 3 is occasionally biased to the left and right without being stably retained at a center part of a space 8. In such a case, the fused metal of the soluble conductor 3 is prone to flow into a location in which the flux 9 is retained; there emerges a phenomenon that the blowout of the soluble conductor 3 is unlikely to occur at a site which is short of the flux 9; and there has been a problem that extended time is taken until the blowout of the conductor reliably occurs.

Further, in a structure in which a metal pattern is formed on an insulation cover as in the invention described in Patent Document 1 or in a structure in which a groove or band is provided at the periphery of an electrode as in the invention described in Patent Document 2, the flux on a soluble conductor cannot be stably retained. Further, in a method of forming a metal pattern on an insulation cover member, of the structure disclosed in Patent Document 1, there is a need to print the metal pattern after molding an insulation cover, and a material cost increases. Similarly, in the structure disclosed in Patent Document 2 as well, a groove or glass band for preventing spread wetting of a fused alloy must be provided at the periphery of an electrode to which a soluble alloy is connected, which is high in cost. In addition, in the structure of Patent Document 1, in the event that the insulation cover side causes an abnormality such as a thermal deformation, a metal pattern and the electrode of the insulation cover may be short-circuited due to shortening of a distance from the insulation cover.

This invention has been made in view of the above-described background art, and aims to provide a protection element which is stably retaining a flux on a soluble conductor at a predetermined position, enabling reliable blowout of the soluble conductor in the event of an abnormality, and a secondary battery device employing the protection element.

Means for Solving the Problem(s)

This invention is directed to a protection element having: a soluble conductor which is disposed on an insulation baseboard, is connected to a power supply path of a device targeted to be protected, and causes a blowout due to a predetermined abnormal electric power; an insulation cover member which is mounted on the baseboard, for covering the soluble conductor via a predetermined space; and a flux coated on a surface of the soluble conductor and positioned in the space, wherein: in a case where the abnormal electric power is supplied to the device targeted to be protected, the soluble conductor causes a blowout, and a current path thereof is shut off, the protection element comprising a stepped portion which is formed on an interior face of the insulation cover member in opposite to the soluble conductor, for retaining the flux at a predetermined position in the space in contact with the flux.

The stepped portion is formed by a protrusion, protrusive stripe and the like which is formed on the interior face of the insulation cover member. It is preferable that the stepped portion be made of a protrusive stripe formed in a circular shape such that a center part of the soluble conductor is surrounded by the interior face of the insulation cover member. In particular, it is preferable that the stepped portion be made of a protrusive stripe formed in a cylindrical shape such that the center part of the soluble conductor is surrounded by the interior face of the insulation cover member.

Alternatively, the stepped portion may be formed by a recess formed on the interior face of the insulation cover member. In addition, the stepped portion may be formed by a polygonal protrusion formed on the interior face of the insulation cover member.

It is preferable that, with the soluble conductor causing a blowout, an end face at a side of the soluble conductor of the stepped portion be provided at a position with which a top part of the blowout soluble conductor does not come into contact, and a current path risen with surface tension may be shut off due to the blowout of the soluble conductor.

In addition, a protrusion opposed to the stepped portion may be provided at an end of the soluble conductor.

The stepped portion may be an opening of a through hole which is formed on the insulation cover member. Further, the stepped portion may be openings of a plurality of through holes formed on the insulation cover member.

A cutout portion communicating with a space on a back side of the insulation cover is formed in the protrusive stripe. Further, the cutout portion may be provided at a position which is symmetrical to a center axis of the insulation cover member.

A heating element is laminated on the baseboard via an insulation layer; the soluble conductor and the heating element are connected between a plurality of electrodes formed on the baseboard; and the number of the electrodes on the baseboard is three or less.

With respect to a size of the baseboard, dimensional ratios thereof meet a condition that a length to thickness ratio is 1080%:50 to 78% and a width to thickness ratio is 640%:50 to 78%. Further, the dimensional ratios meet a condition that a length to thickness ratio is 1080%:50 to 78% and a width to thickness ratio is 640%:50 to 56%.

Furthermore, this invention is directed to a secondary battery device in which the protection element is provided in a power supply path of a secondary battery.

Advantageous Effect(s) of the Invention

According to the protection element of this invention, a stepped portion for retaining a flux inside of an insulation cover member is provided, thus enabling the flux to be stably retained at a predetermined position. In this manner, in particular, in a case where a flux with its low degree of activity (such as a halogen-free flux) is used, it is possible to prevent uneven distribution of the degree of activity due to the bias of a retention state after coating the flux. Further, dispersion of operation can be extremely reduced in a blowout operation of a soluble conductor, in particular, in characteristics of a heating operation of low power. Moreover, it becomes possible to form a protection element with its small environment burden by employing a halogen-free flux.

In addition, according to an aspect of the present invention, it becomes possible to visually check an appearance of an inside flux by providing an opening on the insulation cover member.

Further, according to another aspect of the present invention, by forming a cutout portion at a retention blowout portion, a void inside of the flux, which occurs at the time of printing, can be released, and can be stably retained at a predetermined position. In particular, in a case where a flux with its low degree of activity (halogen-free) is used, it is possible to prevent uneven distribution of the degree of activity due to the bias of the retention state after coating the flux.

Still further, according to another aspect of the present invention, a terminal at an electrode side, which is used exclusively for fixing a protection element to a package board, is opened on a baseboard, and the number of electrodes on the baseboard to be connected to the heating element or soluble conductor is limited to three or less, whereby a heat released from the baseboard through the electrodes is restrained, and a blowout time can be reduced.

And still further, according to another aspect of the present invention, by restraining a board dimensional ratio, there can be provided a protection element which is capable of reducing the heat capacity of a baseboard while maintaining a board strength, reducing a blowout time more significantly than that of a conventional protection element, and achieving reduction of a height of the protection element, namely the protection element according to the present invention is capable of achieving clashing objectives of reducing a blowout time and achieving reduction of a height of a protection element.

Yet furthermore, according to a secondary battery device of this invention, a protection element is stably and reliably actuated against an overvoltage/overcurrent; a secondary battery is protected, and accidents such as overheat or firing of a secondary battery can be reliably prevented in advance.

BEST MODE FOR CARRYING OUT THE INVENTION

Figure 1:
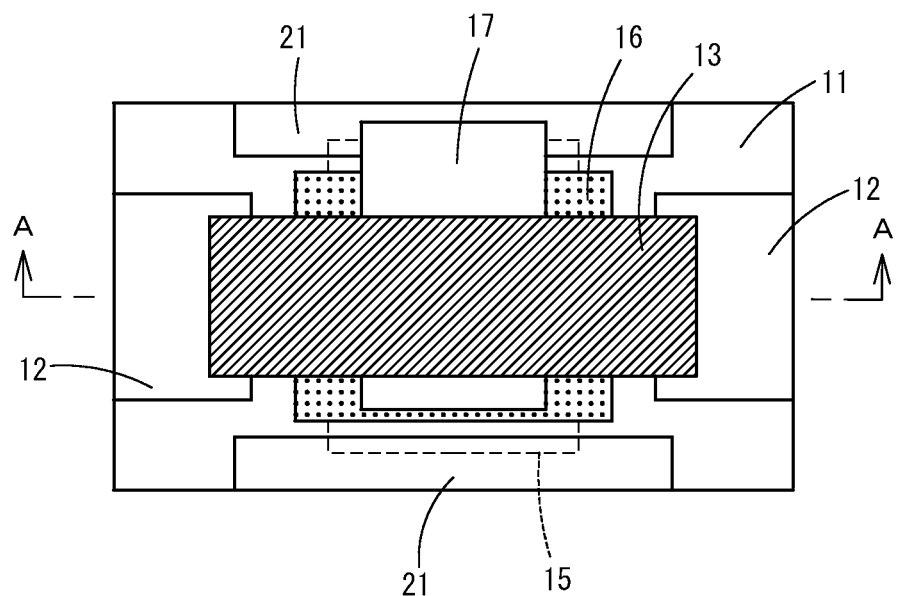
[FIG. 1] It is a plan view of a state in which an insulation cover member of a protection element of a first embodiment of this invention is removed.

Hereinafter, a first embodiment of a protection element of this invention will be described referring to FIGS. 1 to 4. In a protection element 10 of this embodiment, a soluble conductor 13 which is a fuse made of a low-melting metal is provided between a pair of electrodes 12 which are formed at both ends of a top face of an insulation baseboard 11. On the baseboard 11, an insulation cover member 14 as an insulation member is provided facing the soluble conductor 13. Further, on the baseboard 11 of the protection element 10, another pair of electrodes 21 is provided at an opposite edge part which is orthogonal to the pair of electrodes 12, and a heating element 15 made of a resistor member is connected therebetween. The heating element 15 is laminated on the soluble conductor 13 via an insulation layer 16 and a conductor layer 17.

The baseboard 11 may be made of any material as long as it has insulation properties, and an insulation board employed for a printed wiring board, such as a ceramics board or a glass epoxy board, for example, is preferable. In addition, while a glass board, a resin board, or an insulation-processed metal board, etc., may be appropriately employed for its usage, a ceramics board having its superior heat resistance and good thermal conductivity is further preferable.

Any low-melting metal of the soluble conductor 13 may be employed as long as it is soluble at predetermined electric power, and a variety of publicly known low-melting metals can be used as materials for a fuse. For example, Bi/Sn/Pb alloy, Bi/Pb/Sn alloy, Bi/Pb alloy, Bi/Sn alloy, Sn/Pb alloy, Sn/Ag alloy, Pb/In alloy, Zn/Al alloy, In/Sn alloy, or Pb/Ag/Sn alloy, etc., can be employed.

A resistor member forming the heating element 15 is obtained by coating and burning a resistance paste made of an inorganic binder of a conductive material such as ruthenium oxide or carbon black and a glass or an organic binder of a thermosetting resin. In addition, this resistor member may be formed by printing and burning a thin film of ruthenium oxide or carbon black, etc., may be formed by means of plating, vapor deposition, or sputtering, or alternatively, may be formed by attaching or laminating films of these materials for the resistor member, for example.

An insulation cover member 14, which is mounted on the baseboard 11, is formed in the shape of a box which opens at one side face part thereof; and is adapted to cover the baseboard 11, with a predetermined space 18 being formed relative to the soluble conductor 13. On an interior face 14a of the insulation cover member 14, a cylindrical protrusive stripe 20 which is provided with a concentrically circular stepped portion 20a is formed at a position facing a center part of the soluble conductor 13. The protrusive stripe 20 is integrally formed with the insulation cover member 14, and is formed so that a projection position relative to the baseboard 11 is located at the periphery of the heating element 15.

A material for the insulation cover member 14 may be an insulation material having a heat resistance which is endurable to a heat at the time of blowout of the soluble conductor 13 and a mechanical strength which is suitable as the protection element 10. A variety of materials, including a board material employed for a printed wiring board, such as a glass, ceramics, plastics, or a glass epoxy resin, for example, can be applied. Further, an insulation layer such as an insulation resin may be formed on an opposite face to the baseboard 11 by employing a metal plate. Preferably, a material having high mechanical strength and insulation properties, such as ceramic, is appropriate, since it contributes to thinning of the entire protection element.

Figure 2:
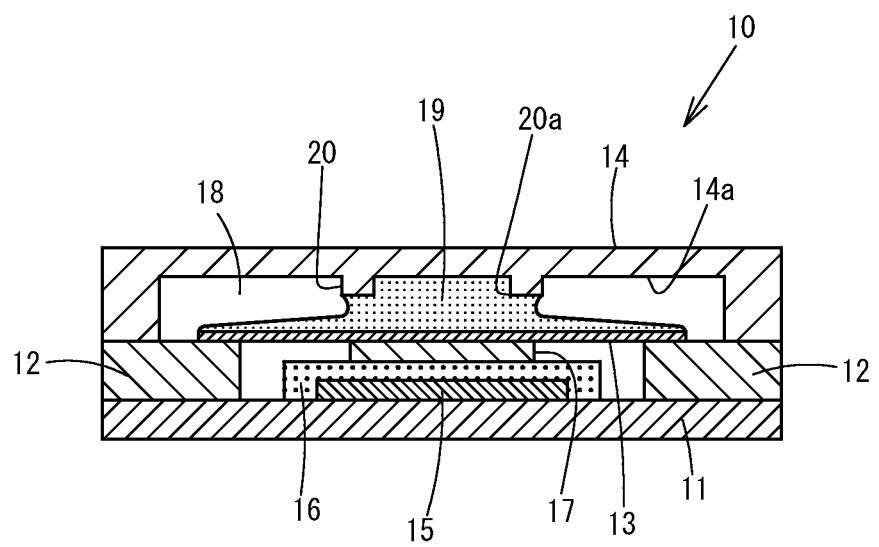
[FIG. 2] It is a sectional view taken along the line A-A of FIG. 1, of a state in which the insulation cover member is mounted.
Figure 3:
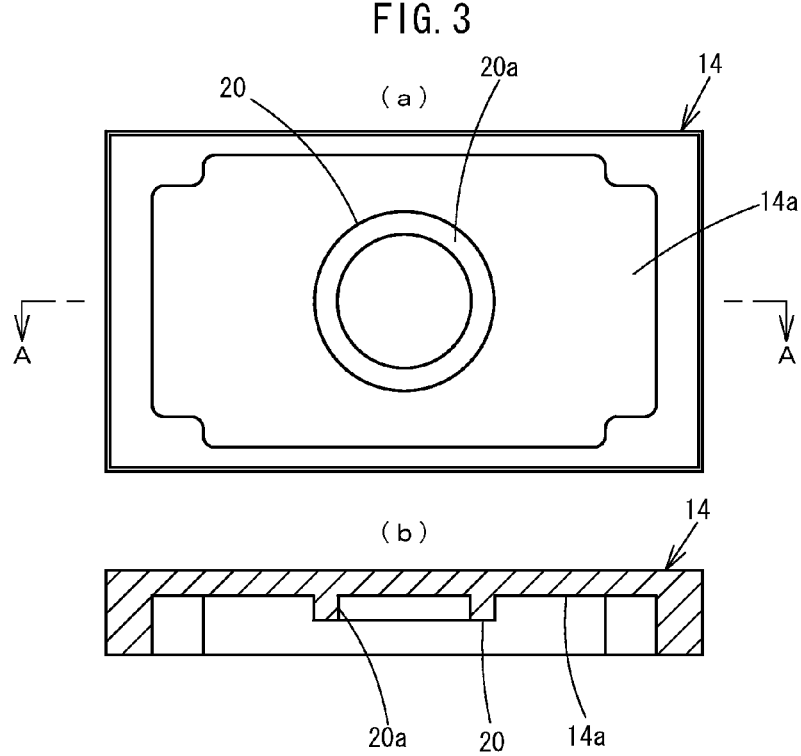
[FIG. 3] It is a bottom view (a) of the insulation cover member of the embodiment and a sectional view taken along the line A-A of the bottom view.

On a full surface of the soluble conductor 13, a flux 19 is provided in order to prevent oxidization of the surface thereof. As the flux 19, a halogen-free flux, which does not have a halogen element such as bromine, is preferred. The flux 19 is retained on the soluble conductor 13 by means of surface tension; is accommodated in the space 18; and as shown in FIG. 2, adheres to the protrusive stripe 20 formed on the interior face 14a of the insulation cover member 14; and is stably retained by means of the stepped portion 20a due to its wettability. The flux 19 is thereby stably retained without being displaced from the center part of the soluble conductor 13.

Herein, a protrusion height from the interior face 14a of the protrusive stripe 20 is preferred as a height to an extent such that a surface of the coated flux 19 is in contact with the soluble conductor 13, enabling the flux 19 to be retained due to its wettability and surface tension; its limit is placed to an extent such that a blowout soluble conductor of a low-melting metal, causing the blowout due to abnormal electric power, allows a top part having spherically risen due to its surface tension to just come into contact with somewhere; and preferably, it is appropriate that a protrusion height be the one to an extent such that no such contact occur.

Figure 4:
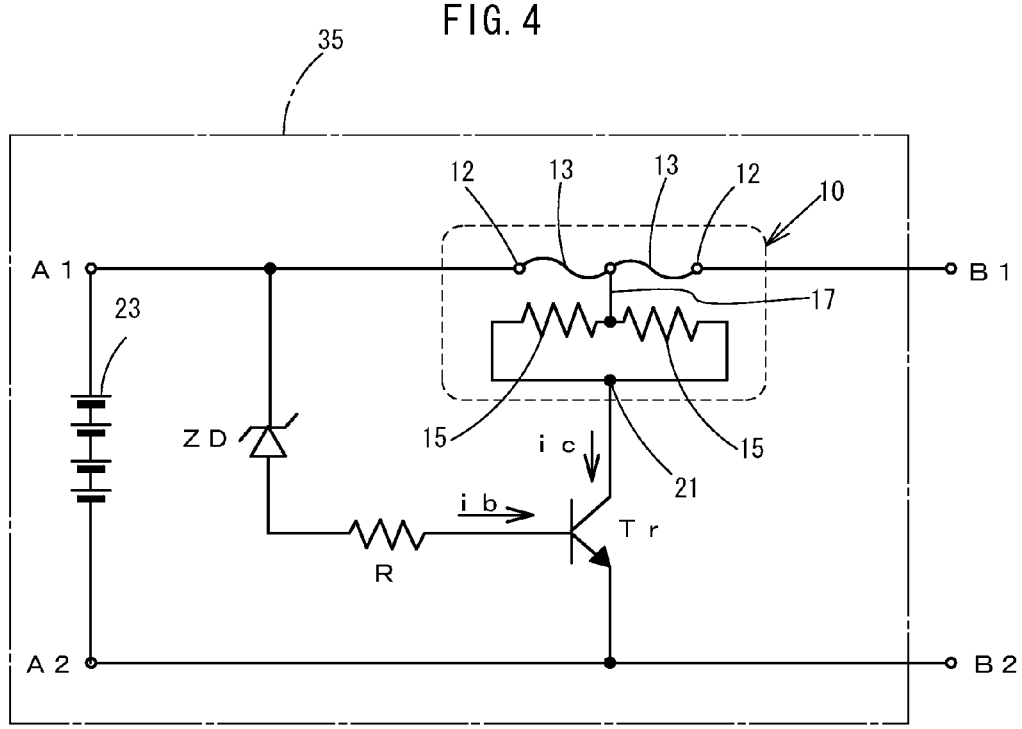
[FIG. 4] It is a circuit diagram of a secondary battery device in which a protection element of the embodiment is provided.

An overcurrent/overvoltage protection circuit 35 of a secondary battery device employing the protection element 10 of the embodiment, has a circuit construction as shown in FIG. 4, for example. In this overcurrent/overvoltage protection circuit 35, a pair of electrodes 12 of the protection element 10 to be connected in series between an output terminal A1 and an input terminal B1; one terminal of the pair of electrodes 12 of the protection element 10 is connected to an input terminal B1; and the other electrode 12 is connected to the output terminal A1. Afterwards, a neutral point of the soluble conductor 13 is connected to one end of the heating element 15, and one terminal of the electrode 21 is connected to the other terminal of the heating element 15. The other terminal of the heating element 15 is connected to a collector of a transistor Tr, and an emitter of the transistor Tr is connected between the other input terminal A2 and an output terminal B2. Further, an anode of a Zener diode ZD is connected to a base of the transistor Tr via a resistor R, and a cathode of the Zener diode ZD is connected to the output terminal A1.

The resistor R is set between the output terminals A1 and A2 so that a voltage beyond a breakdown voltage is applied to the Zener diode ZD when a predetermined voltage, which is set to be abnormal, is applied. In addition, as in the circuit diagram of FIG. 4, the soluble conductor 13 may be formed so as to cause blowouts at two sites by means of the heating element 15.

An electrode terminal of a secondary battery 23, which is a device targeted to be protected, such as a lithium ion battery, for example, is connected between the output terminals A1 and A2, and an electrode terminal of equipment such as a battery charger, although not shown, which is used to be connected to the secondary battery 23, is connected to the input terminals B1, B2.

Next, an operation of the protection element 10 of the embodiment will be described. In the secondary battery device, such as a lithium ion battery, on which the overcurrent/overvoltage protection circuit 35 of the embodiment is mounted, if an abnormal voltage is applied to the output terminals A1, A2 at the time of charging thereof, a reverse voltage beyond a breakdown voltage is applied to the Zener diode ZD at a predetermined voltage which is set to be abnormal, the Zener diode ZD becomes conductive. Due to the conduction of the Zener diode ZD, a base current ib flows a base of a transistor TR, whereby a transistor Tr is turned ON, a collector current is flows the heating element 15, and the heating element 15 then generates a heat. This heat is transmitted to the soluble conductor 13 of a low-melting metal on the heating element 15; the soluble conductor 13 causes a blowout; and continuity between the input terminal B1 and the output terminal A1 is shut off, preventing an overvoltage from being applied to the output terminals A1, A2.

At this time, the flux 19 is retained at the center part of the soluble conductor 13, causing the blowout speedily and reliably at a predetermined blowout position. In addition, as in the circuit of FIG. 4, for example, if the soluble conductor 13 of a low-melting metal is disposed so that blowouts at two sites occur, power supply to the heating element 15 is completely shut off due to the blowouts. In addition, in a case where an abnormal current has flowed toward the terminal A1 as well, the soluble conductor 13 is set to generate a heat and to cause the blowout due to the flow of the abnormal current.

According to the protection element 10 of the embodiment, on the interior face 14a of the insulation cover member 14, the protrusive stripe 20 shaped like a protrusive cylinder is provided in opposite to the soluble conductor 13, enabling the flux 19 to be stably retained at a predetermined position by means of the stepped portion 20a of the protrusive stripe 20. In this manner, in a case where a flux 19 such as a halogen free flux with its low degree of activity is used as well, the bias of the degree of activity due to the bias or dispersion of a state in which the flux 19 is coated can be prevented, ensuring a blowout of the soluble conductor 13. In particular, in heating operation characteristics of low-power, it becomes possible to provide a protection element 10 which is capable of reducing dispersion more remarkably than a conventional operational dispersion and is environmentally acceptable.

Further, since the protrusive stripe 20 shaped like a closed ring-like cylinder is provided, the flux 19 is retained at the protrusive stripe 20 stably and uniformly due to its own surface tension, and neither moves nor is unevenly distributed on the soluble conductor 13.

Moreover, according to the secondary battery device of the embodiment, the secondary battery 23 is stably and reliably protected from an overvoltage/overcurrent, enabling accidents such as overheating or firing of the secondary battery 23 to be reliably prevented.

Figure 5:
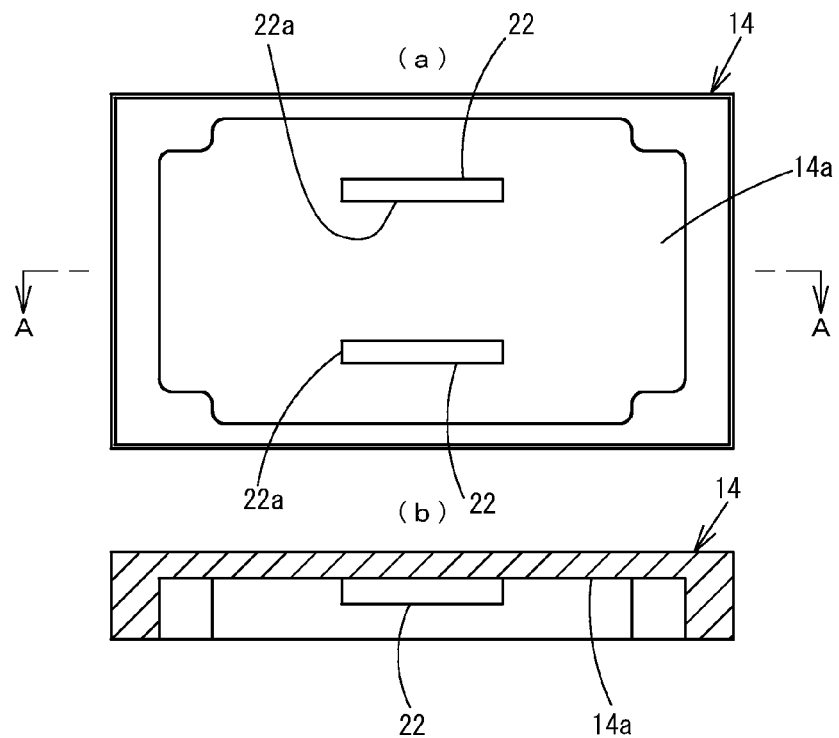
[FIG. 5] It is a bottom view (a) of an insulation cover member of a second embodiment of this invention and a sectional view (b) taken along the line A-A of the bottom view.

Next, a second embodiment of the protection element of this invention will be described referring to FIG. 5. Like constituent elements of the above-described embodiment are designated by like reference numerals, and a duplicate description is omitted here. On an interior face 14a of an insulation cover member 14 of a protection element 10 of the embodiment, two protrusive stripes 22 which are parallel to each other are formed at a center part to be parallel along a long side, and a stepped portion 22a is provided. The protrusive stripes 22 are formed so that a projection position relative to a baseboard 11 surrounds a center part of a heating portion.

According to the insulation cover member 14 of the protection element 10 of the embodiment, it becomes possible to stably retain a flux 19 at a predetermined position by means of a stepped portion 22a of the protrusive stripe 22. Since the protrusive stripes 22 which are parallel to each other are formed in length which is on the order of ¼ to ⅓ of the long side of the baseboard 11, the flux 19 is never unevenly distributed than necessary, and is reliably retained between the protrusive stripes 22. In this manner, advantageous effect similar to that of the above-described embodiment can be attained.

Figure 6:
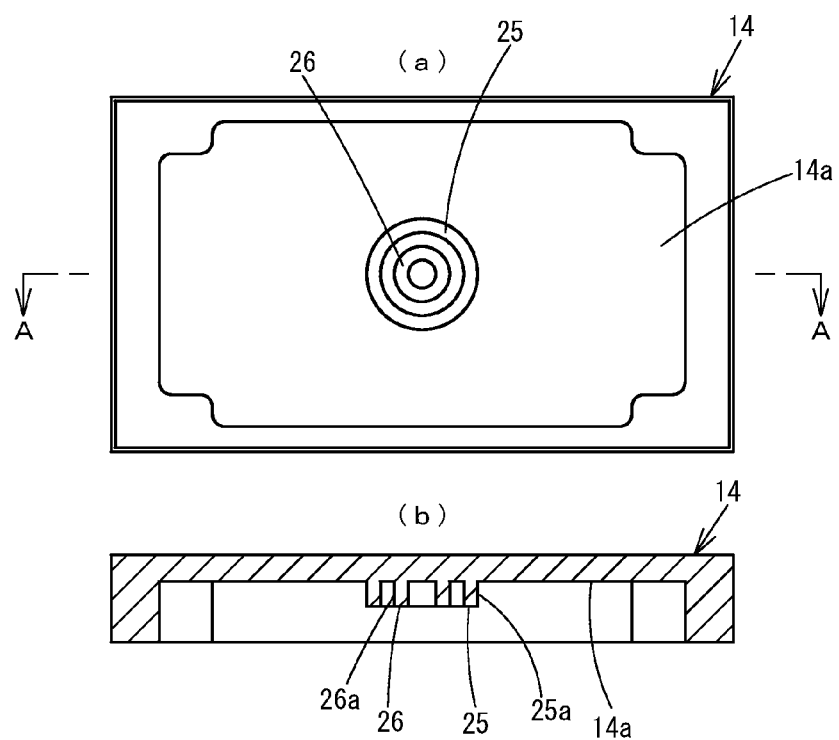
[FIG. 6] It is a bottom view (a) of an insulation cover member of a third embodiment of this invention and a sectional view (b) taken along the line A-A of the bottom view.

Next, a third embodiment of the protection element of this invention will be described referring to FIGS. 6 to 8. Like constituent elements of the above-described embodiments are designated by like reference numerals, and a duplicate description is omitted here. Referring to FIG. 6, on an interior face 14a of an insulation cover member 14 of the embodiment of this invention, the stepped portions 25a, 26a are formed by means of protrusive stripes 25, 26 shaped like dual concentric circles. By means of these protrusive stripes 25, 26 of the insulation cover member 14 of the embodiment as well, it becomes possible to stably retain a flux 19 at a center part of a soluble conductor 13, due to surface tension of the flux 19. In this manner, advantageous effect similar to those of the above-described embodiments can be attained.

Figure 7:
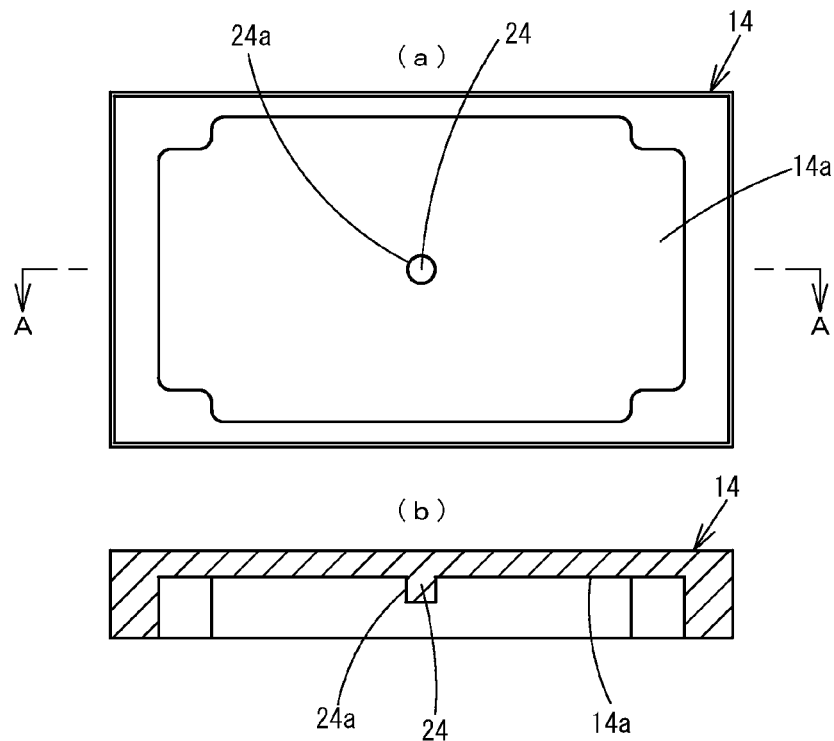
[FIG. 7] It is a bottom view (a) of the insulation cover member of the third embodiment of this invention and a sectional view (b) taken along the line A-A of the bottom view.
Figure 8:
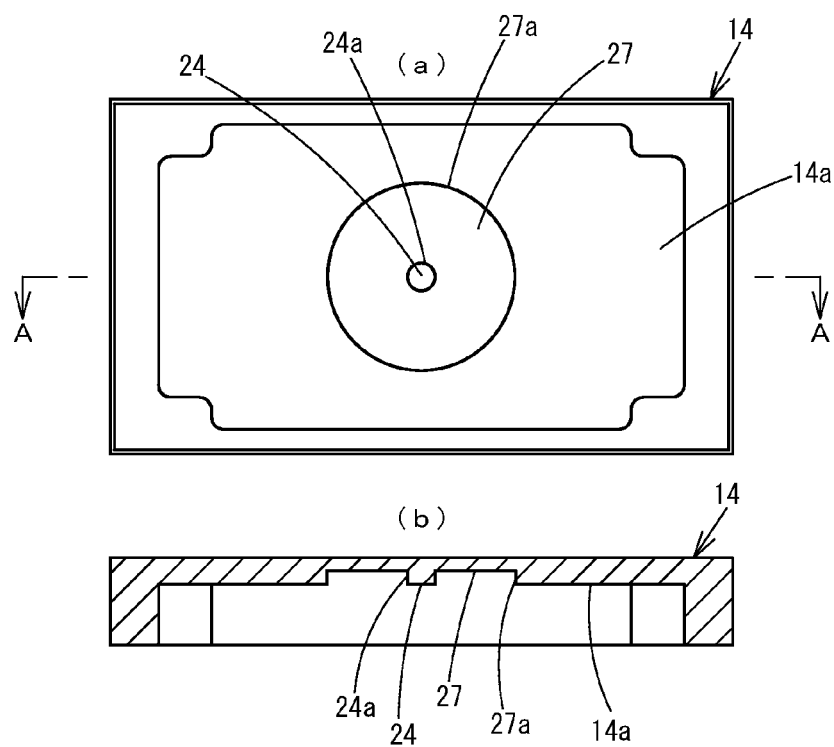
[FIG. 8] It is a bottom view (a) of the insulation cover member of the third embodiment of this invention and a sectional view (b) taken along the line A-A of the bottom view.

Further, as shown in FIG. 7, one protrusion 24 may be formed on the interior face 14a of the insulation cover member 14. By means of the stepped portion 24a of the protrusion 24 of the insulation cover member 14 of the embodiment as well, it becomes possible to stably retain the flux 19 at the center of the soluble conductor 13, due to surface tension of the flux 19. Moreover, as shown in FIG. 8, a cylindrical recess 27 and a protrusion 24 at a center part of the recess are provided, whereby stepped portions 24a, 27a may be formed.

Figure 9:
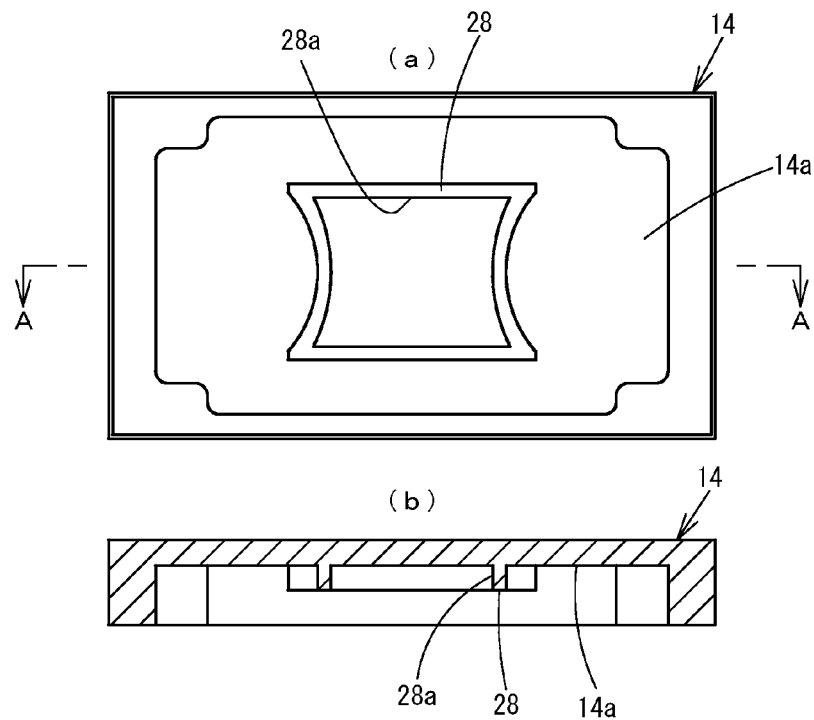
[FIG. 9] It is a bottom view (a) of an insulation cover member of a fourth embodiment of this invention and a sectional view (b) taken along the line A-A of the bottom view.
Figure 10:
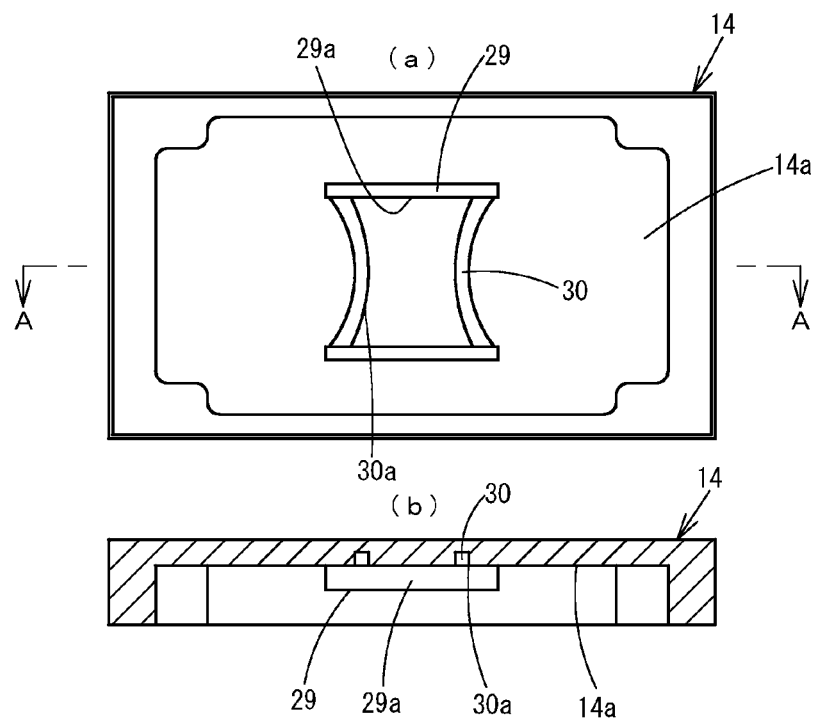
[FIG. 10] It is a bottom view (a) of the insulation cover member of the fourth embodiment of this invention and a sectional view (b) taken along the line A-A of the bottom view.

Next, a fourth embodiment of the protection element of this invention will be described referring to FIGS. 9 and 10. Like constituent elements of the above embodiments are designated by like reference numerals, and a duplicate description is omitted here. Referring to FIG. 9, a drum-shaped protrusive stripe 28 is formed on an interior face 14a of an insulation cover member 14 of the embodiment of this invention. By means of the stepped portion 28a of the protrusive stripe 28 of the insulation cover member 14 of the embodiment as well, it becomes possible to stably retain a flux 19 at a center part of a soluble stripe 13, due to surface tension of the flux 19. In addition, as shown in FIG. 10, stepped portions 29a, 30a may be formed by means of a combination of protrusive stripes 29, which are parallel to each other, and a recessed groove portion 30, which is provided therebetween and is curved.

Figure 11:
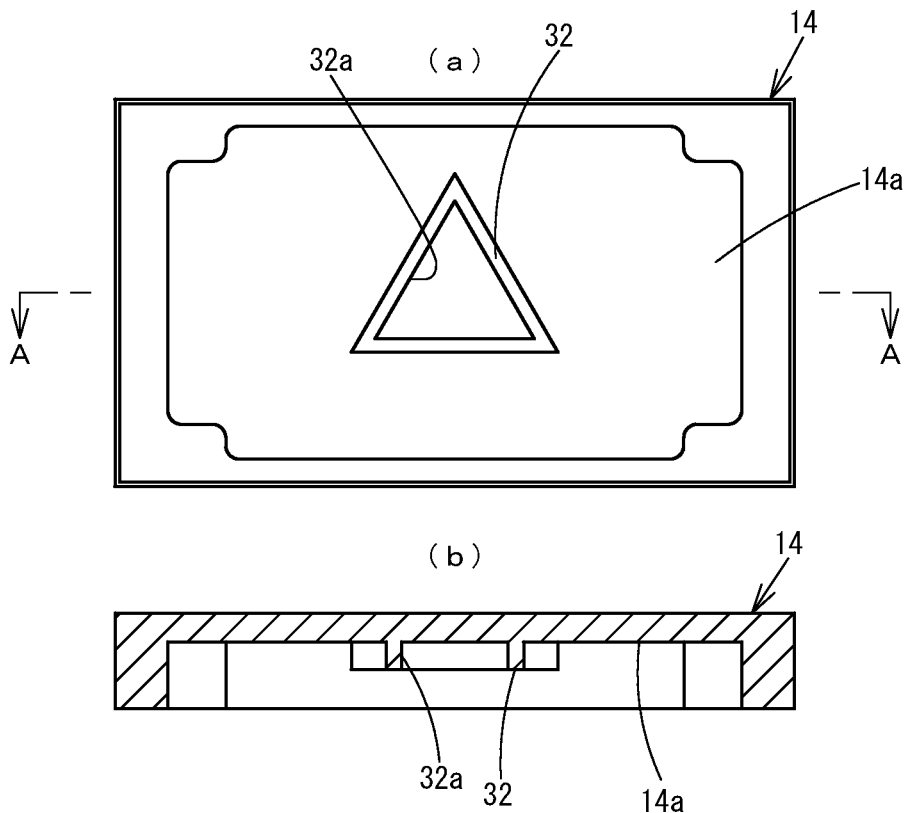
[FIG. 11] It is a bottom view (a) of an insulation cover member of the fifth embodiment of this invention and a sectional view (b) taken along the line A-A of the bottom view.

Next, a fifth embodiment of the protection element of this invention will be described referring to FIG. 11. Here, like constituent elements of the above-described embodiments are designated by like reference numerals and a duplicate description is omitted here. On an interior face 14a of an insulation cover member 14 of the embodiment of this invention, as shown in FIG. 11, a stepped portion 32a is formed by a protrusive stripe 32 shaped like a polygon such as a triangle. As a polygon to be formed, the shape of a rectangle, a hexagon, or an octagon, which is symmetrical in the longitudinal and transverse directions on the interior face 14a, is preferably appropriate from the viewpoint of prevention of the bias of a flux 19. By means of a protrusive stripe 28 of the insulation cover member 14 of the embodiment as well, it becomes possible to stably retain a flux 19 at the center part of a soluble conductor 13, due to surface tension of the flux 19.

Figure 12:
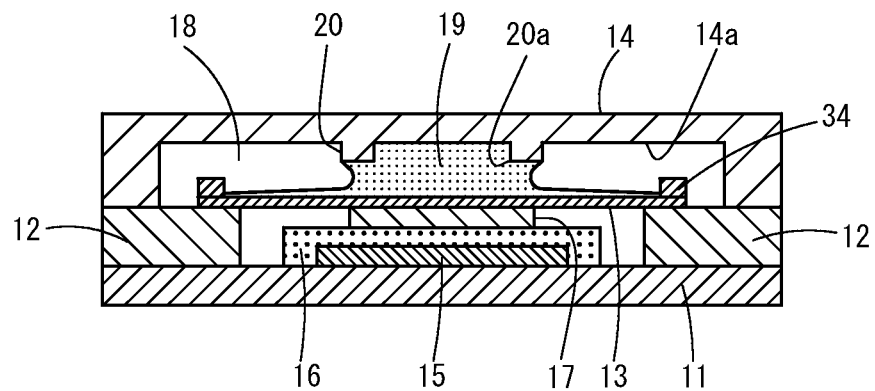
[FIG. 12] It is a bottom view (a) of an insulation cover member of a sixth embodiment of this invention and a sectional view (b) taken along the line A-A of the bottom view.

Next, a sixth embodiment of the protection element of this invention will be described referring to FIG. 12. Like constituent elements of the above-described embodiments are designated by like reference numerals. According to the embodiment of this invention, as shown in FIG. 12, in addition to a protrusive stripe 20 or the like, of an insulation cover member 14, a protrusion 34 is provided at each end of a soluble conductor 13. In this manner, a retention effect of a flux 19 is further enhanced.

Figure 13:
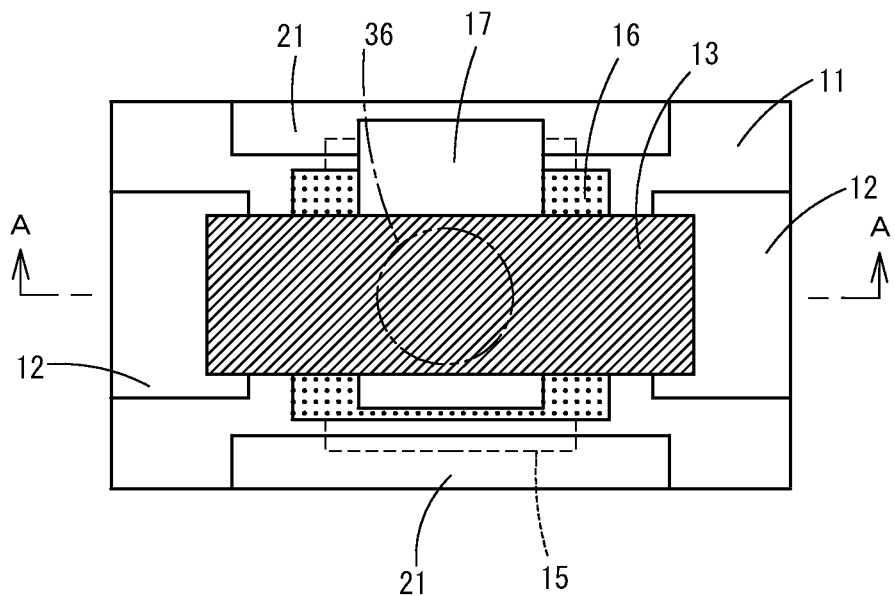
[FIG. 13] It is a plan view of a state in which an insulation cover member of a seventh embodiment of this invention is removed.
Figure 14:
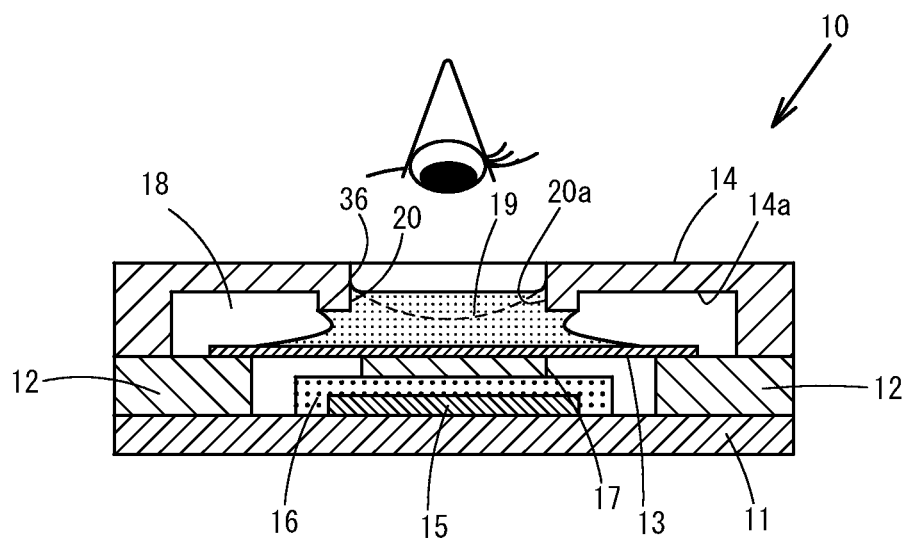
[FIG. 14] It is a longitudinal cross section of a protection element of the seventh embodiment of this invention.

Next, a seventh embodiment of the protecting element of this invention will be described referring to FIGS. 13 and 14. Like constituent elements of the above-described embodiments are designated by like reference numerals, and a duplicate description will be omitted. On an insulation cover member 14 of the embodiment of this invention, as shown in FIG. 14, an opening 36 which is a through hole is formed, and a stepped portion 20a formed by the opening 36 and a protrusive stripe 20 is provided. Through the opening 36, the solvent contained in a flux 19 evaporates, and as indicated by the dashed line of FIG. 14, a surface of the flux 19 is formed in an arc-like recessed shape.

According to the protection element 10 of the embodiment, in addition to advantageous effect similar to those of the above-described embodiments, it is possible to visually recognize a retention state of the flux 19 with naked eyes through the opening 36, and product inspection can be made easier and reliable.

Figure 15:
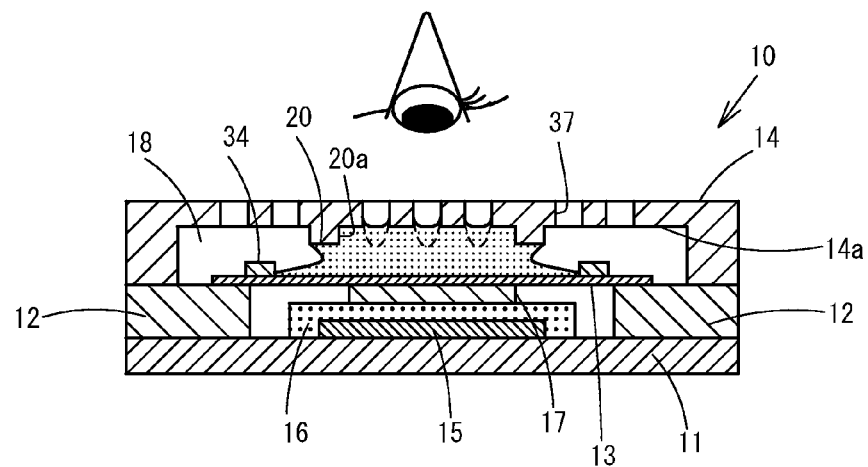
[FIG. 15] It is a longitudinal cross section of an exemplary modification of a protection element of an eighth embodiment of this invention.

Next, an eighth embodiment of a protection element of this invention will be described referring to FIG. 15. Like constituent elements of the above-described embodiments will be designated by like reference numerals, and a duplicate description is omitted. In an insulation cover member 14 of the embodiment of this invention, as shown in FIG. 15, openings 37 which are a plenty of small through holes are formed. Through the openings 37, the solvent contained in a flux 19 evaporates, and like the one indicated by the dashed line of FIG. 14, a surface of the flux 19 is formed in an arc-like recessed shape by opening 37.

By means of a protection element 10 of the embodiment as well, in addition to advantageous effect similar to those of the above-described embodiments, it is possible to visually recognize the retention state of the flux 19 with naked eyes through the opening 37, and product inspection can be made easier and reliable.

Figure 16:
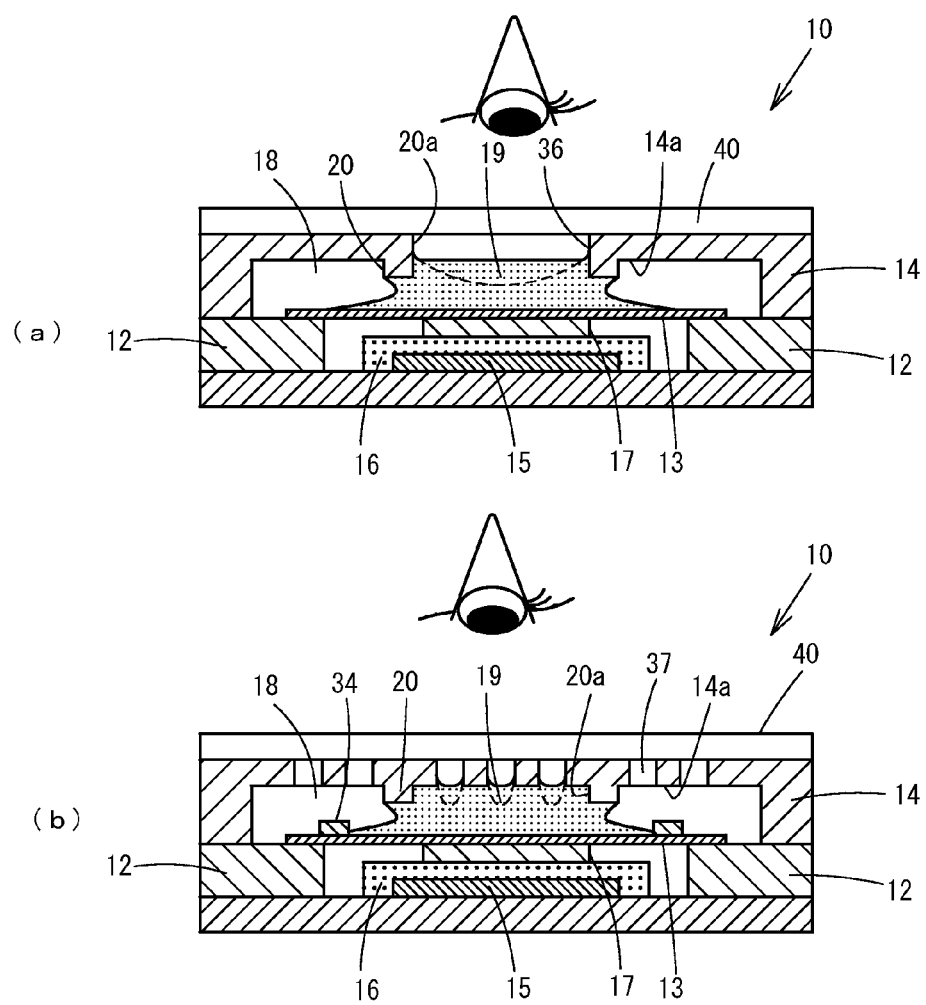
[FIG. 16] It is a longitudinal cross section (a) of an exemplary modification of a protection element of a ninth embodiment of this invention and a longitudinal cross section (b) of another exemplary modification.

Next, a ninth embodiment of the protection element of this invention will be described referring to FIG. 16. Like constituent elements of the above-described embodiments will be designated by like reference numerals, and a duplicate description is omitted. As far as an insulation cover member 14 of the embodiment of this invention is concerned, like the above-described embodiments, an opening 36 which is a through hole is formed in the insulation cover member 14, and a transparent film 40 is attached to a surface of the insulation cover member 14 (FIG. 16 (a)). In addition, openings 37 made of a plurality of through holes are formed, whereby a transparent film 40 may be attached to the surface of the insulation cover member 14 (FIG. 16 (b)). In this case also, a protrusive stripe 20 may be formed on an interior face 14a of the insulation cover member 14 having formed the openings 37 which are a plenty of through holes, and further, a protrusion 34 may be formed on the periphery of an soluble conductor 13 (FIG. 16 (b)).

By means of the protection element 10 of the embodiment as well, in addition to advantageous effect similar to those of the above-described embodiments, it becomes possible to visually recognize the retention state of the flux 19 with naked eyes, and moreover, neither adhering of foreign matter(s) such as dust to the flux 19 nor entry thereof into the flux through the openings 36 and 37, due to the film 40, occurs.

Figure 17:
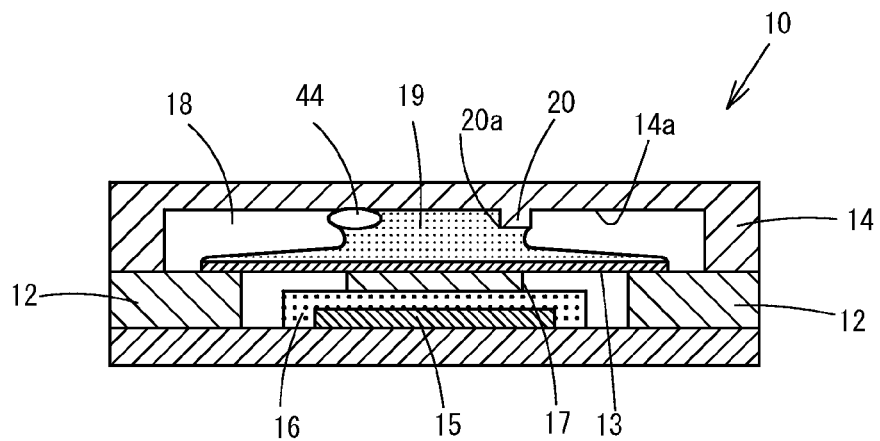
[FIG. 17] It is a longitudinal cross section of a protection element of a tenth embodiment of this invention.
Figure 18:
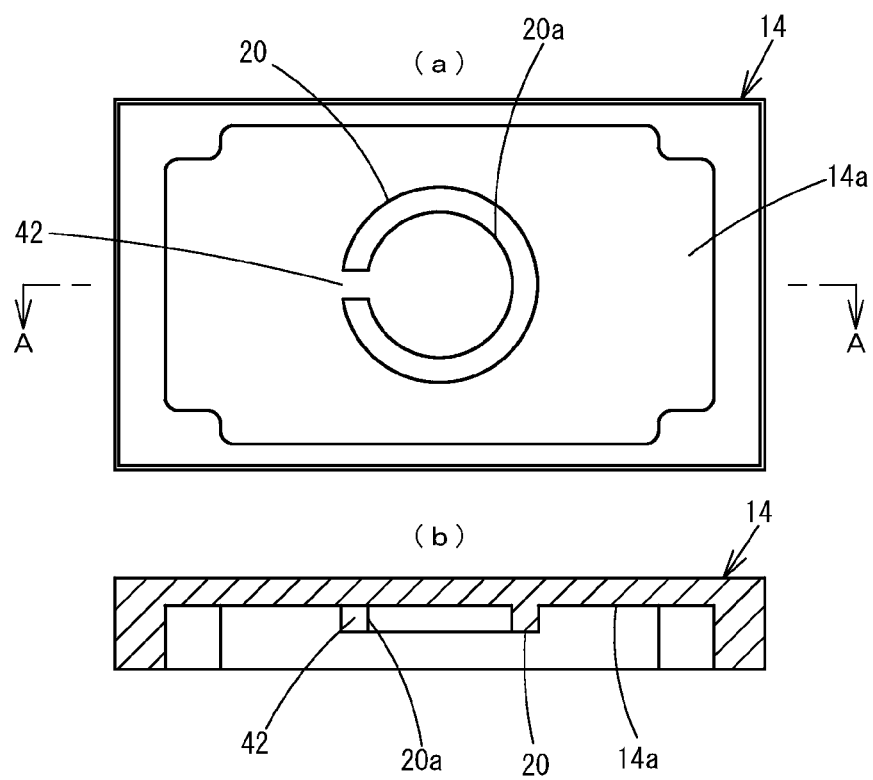
[FIG. 18] It is a bottom view (a) of an insulation cover member of the tenth embodiment of this invention and a sectional view (b) taken along the line A-A of the bottom view.

Next, a tenth embodiment of the protection element of this invention will be described referring to FIGS. 17 and 18. Like constituent elements of the above-described embodiments are designated by like reference numerals, and a duplicate description is omitted. In an insulation cover member 14 of the embodiment of this invention, a protrusive stripe 20 is partially cut out, and a cutout portion 42 is formed.

According to the protection element 10 of the embodiment, in addition to advantageous effect similar to those of the above-described embodiments, void(s) exerted by air or the like having entered the flux 19 at the time of printing can be released from the flux 19 to a peripheral space 18 in the insulation cover member 14 via the cutout portion 42. This makes it possible to eliminate a delay or dispersion of blowout activity of the soluble conductor 13 due to the presence of the void in the flux 19.

Figure 19:
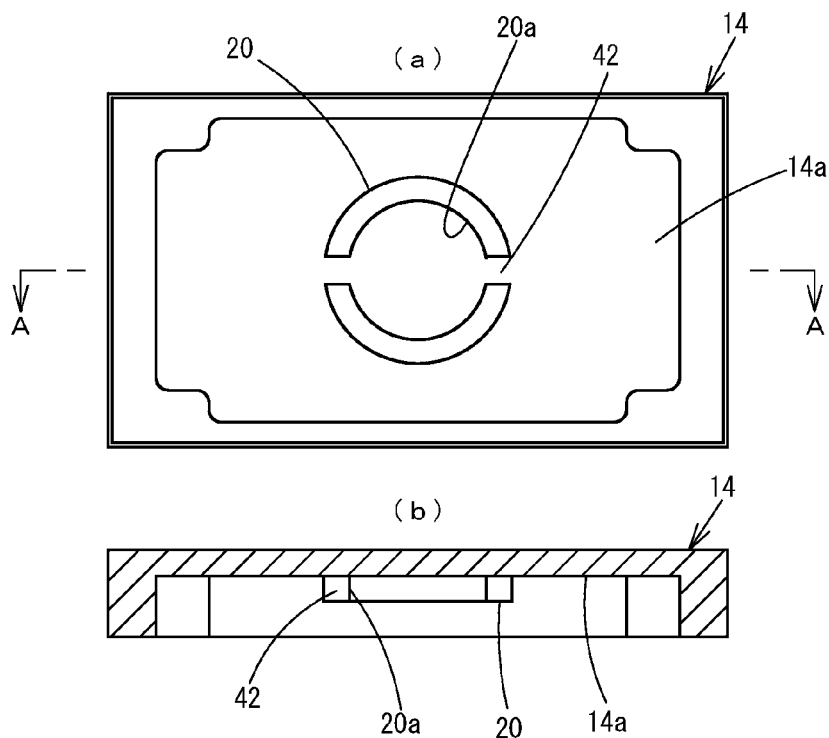
[FIG. 19] It is a bottom view (a) of the insulation cover member of the tenth embodiment of this invention and a sectional view (b) taken along the line A-A of the bottom view.
Figure 20:
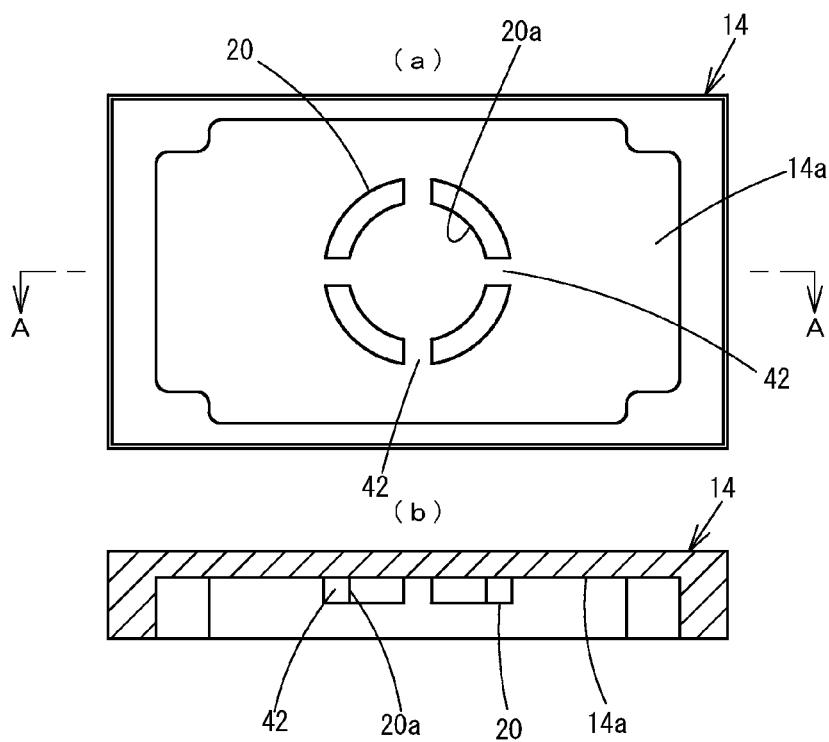
[FIG. 20] It is a bottom view (a) of an insulation cover member in an exemplary modification of the tenth embodiment of this invention and a sectional view (b) taken along the line A-A of the bottom view.

The positions or number of the cutout portions 42 formed in the protrusive stripe 20 of the embodiment can be appropriately set, and as shown in FIGS. 19 and 20, the cutout portions 42 may be disposed at two or four sites as appropriately symmetrical positions to each other.

Figure 21:
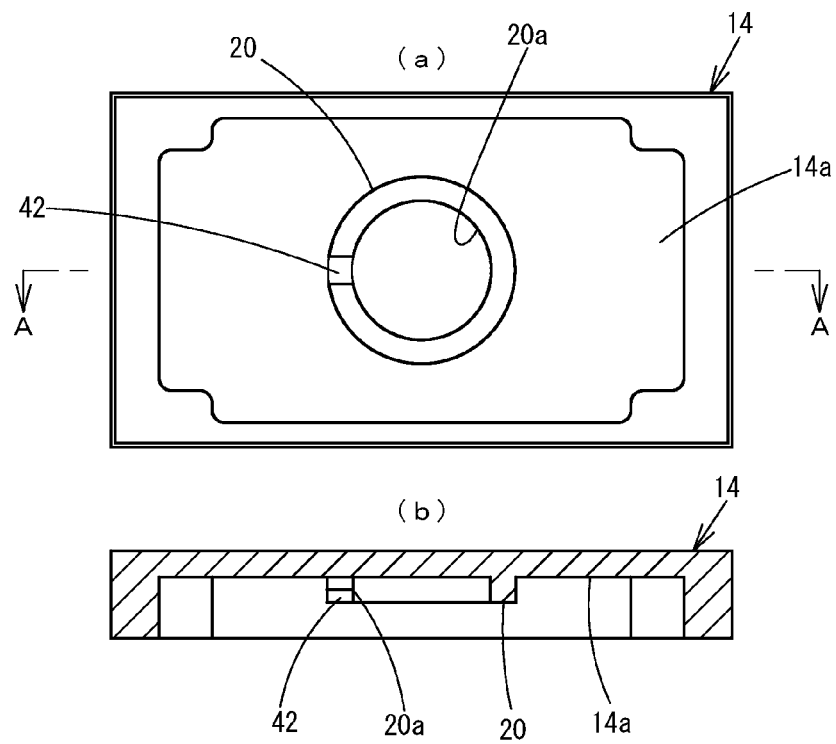
[FIG. 21] It is a bottom view (a) of an insulation cover member in another exemplary modification of the tenth embodiment of this invention and a sectional view (b) taken along the line A-A of the bottom view.
Figure 22:
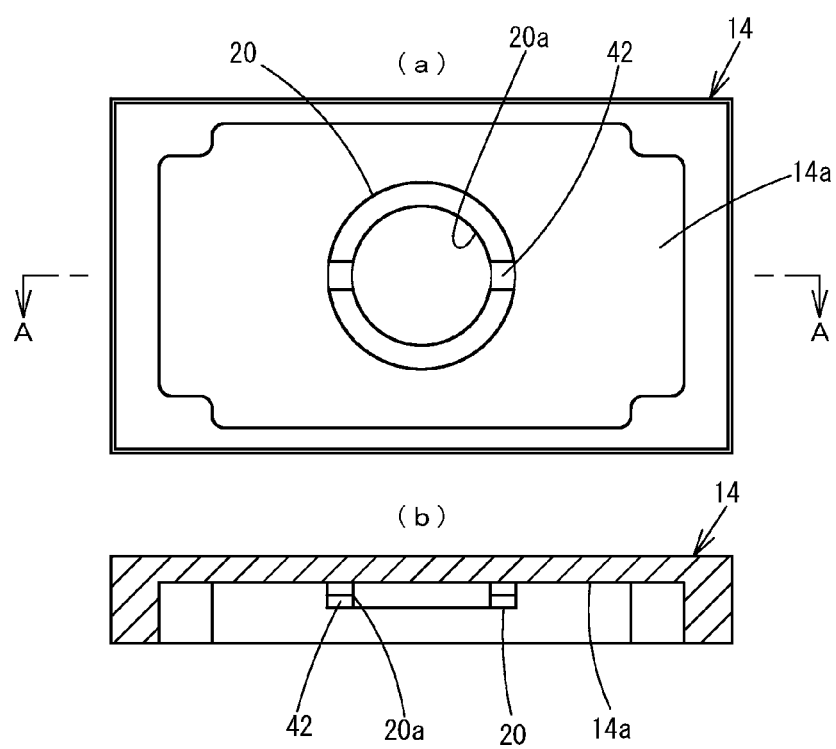
[FIG. 22] It is a bottom view (a) of an insulation cover member in another exemplary modification of the tenth embodiment of this invention and a sectional view (b) taken along the line A-A of the bottom view.
Figure 23:
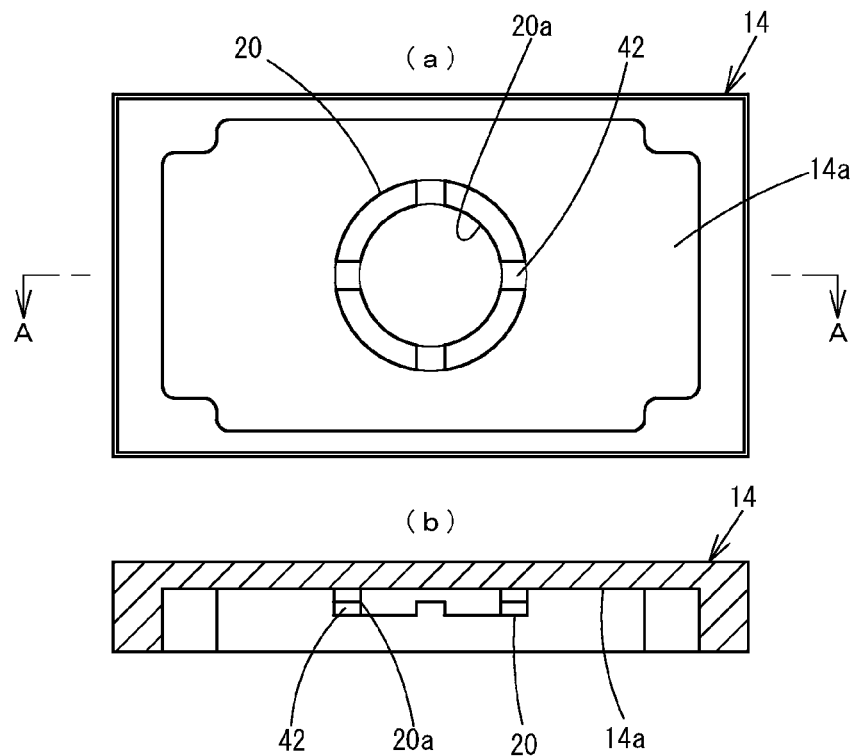
[FIG. 23] It is a bottom view (a) of an insulation cover member in another exemplary modification of the tenth embodiment of this invention and a sectional view (b) taken along the line A-A of the bottom view.
Figure 24:
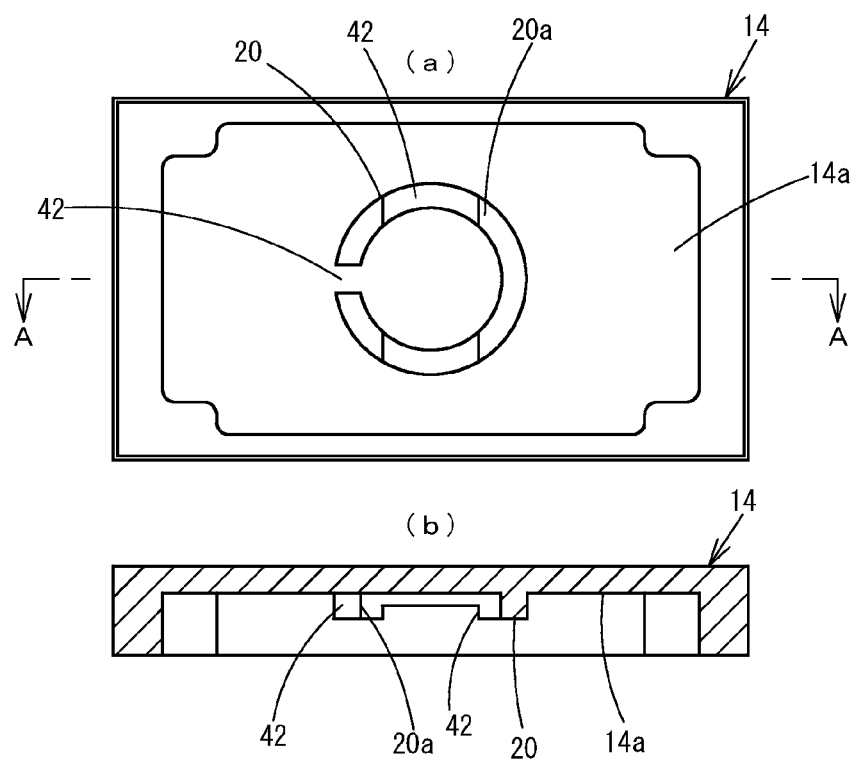
[FIG. 24] It is a bottom view (a) of an insulation cover member in another exemplary modification of the tenth embodiment of this invention and a sectional view (b) taken along the line A-A of the bottom view.
Figure 25:
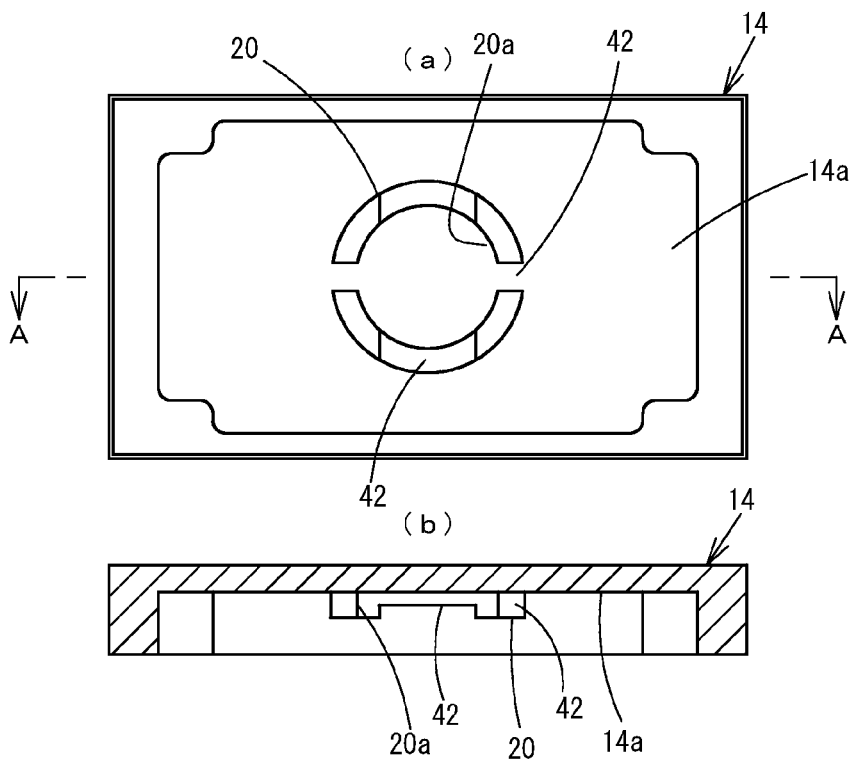
[FIG. 25] It is a bottom view (a) of an insulation cover member in another exemplary modification of the tenth embodiment of this invention and a sectional view (b) taken along the line A-A of the bottom view.
Figure 26:
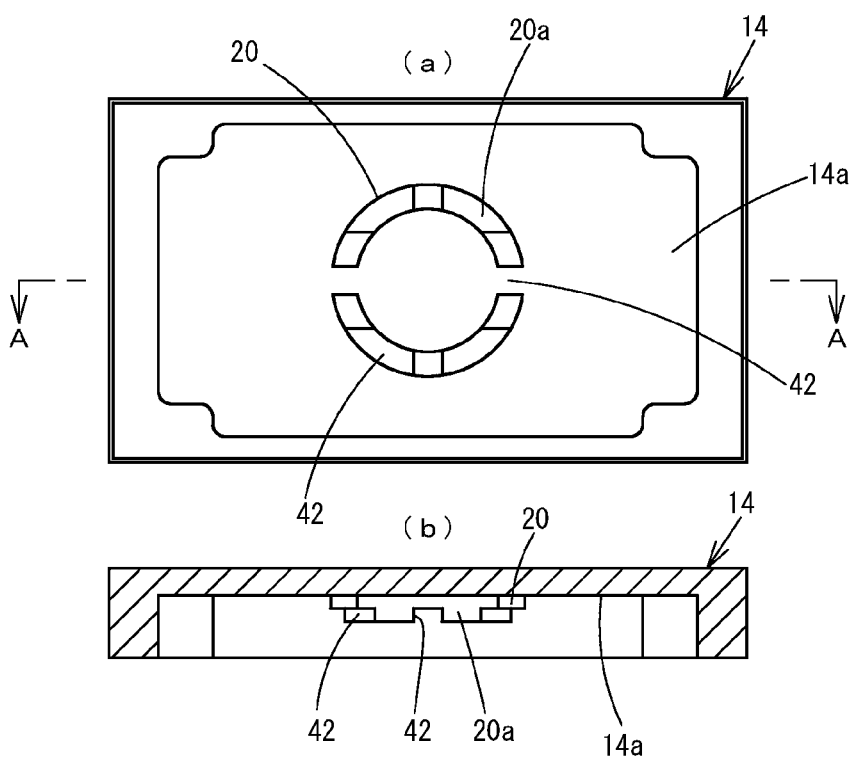
[FIG. 26] It is a bottom view (a) of an insulation cover member in another exemplary modification of the tenth embodiment of this invention and a sectional view (b) taken along the line A-A of the bottom view.

Further, as shown in FIG. 21, the cutout portion 42 may be cut out to be lower than a height of the protrusive stripe 20. Likewise, the positions of the cutout portions 42 that are comparatively shallow as well may be those of the cutout portions formed at two sites of the protrusive stripe 20, as shown in FIG. 22, or alternatively, may be those of the cutout portions formed at four sites of the protrusion 20, as shown in FIG. 23. Further, as shown in FIGS. 24, 25, and 26, the width, size or depth of the cutout portion 42 as well can be arbitrarily set, and these settings may be appropriately combined with each other.

According to the protection element 10 of the embodiment, in addition to advantageous effect similar to those of the above-described embodiment, a void 44 exerted by air or the like, having entered the flux 19 at the time of printing, can be readily released from the flux 19 to a peripheral space 18 in the insulation cover member 14 more reliably. This makes it possible to eliminate a delay or dispersion of blowout activity of the soluble conductor 13 due to the presence of the void 44 in the flux 19.

Figure 27:
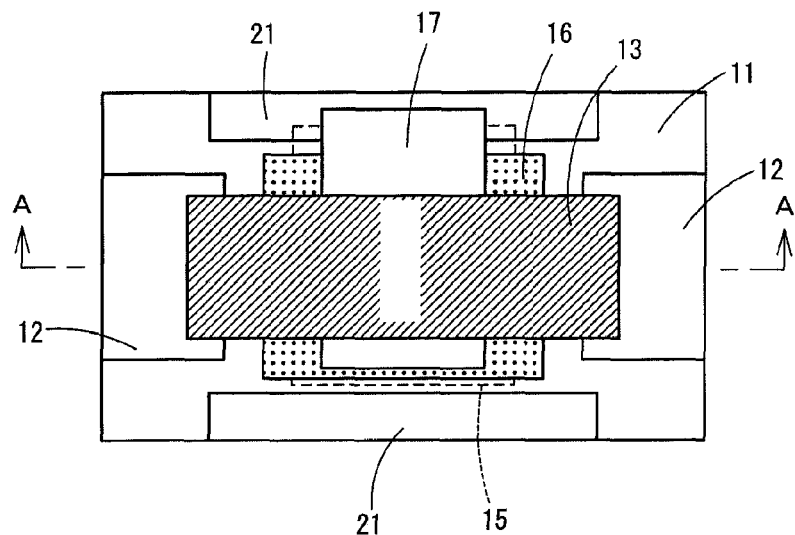
[FIG. 27] It is a plan view of a state in which an insulation cover member of a protection element of an eleventh embodiment of this invention is removed.

Next, an eleventh embodiment of the protection element of this invention will be described referring to FIG. 27. Like constituent elements of the above-described embodiments are designated by like reference numerals, and a duplicate description is omitted. One terminal of a heating element 15 of the protection element 10 of the embodiment is in contact with one of a pair of electrodes 21, and the other terminal comes is in contact with a soluble conductor 13 without being connected to the electrode 21.

In addition, in the embodiment, in a case where a length of a baseboard 11 is 10.8 mm, for example, a thickness of a conventional general baseboard is 0.4 mm to 1.0 mm, and if the thickness is 100%, the baseboard 11 set in a range in which L (length): T (thickness)=1080%:50 to 78% and W (width): T (thickness)=640%:50 to 78% is employed.

According to the protection element 10 of the embodiment, in addition to advantageous effect similar to those of the above-described embodiments, the heat capacity of the baseboard 11 is reduced while maintaining strength of the board, making it possible to restrain extension of a blowout time of the soluble conductor 13 due to the release of a heat from the heating element 15 to the outside or to restrain an occurrence of dispersion. Specifically, the blowout time can be reduced by 30% than the conventional one, and reduction of the height of the protection element 10 can be performed.

The protection element and manufacturing method thereof, according to this invention, is not limitative to the above-described embodiments, it may have a stepped portion, which is capable of retaining a flux, provided at a predetermined position of an interior face of an insulation cover member, whatsoever retention shape of the stepped portion may be. In addition, any material for the flux or insulation cover member may be employed as long as it can be selected as an appropriate one.

EXAMPLE 1

Figure 28:
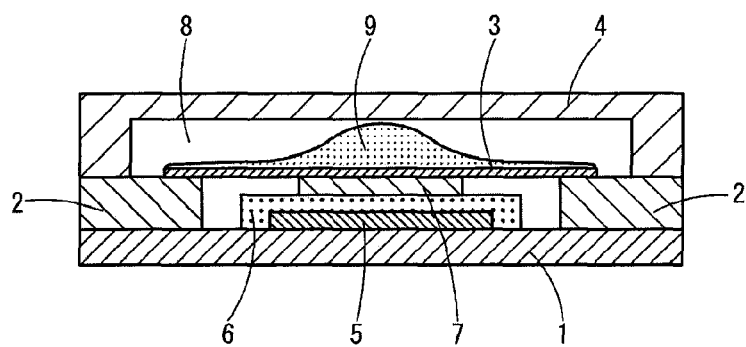
[FIG. 28] It is a longitudinal cross section of a conventional protection element.
Figure 29:
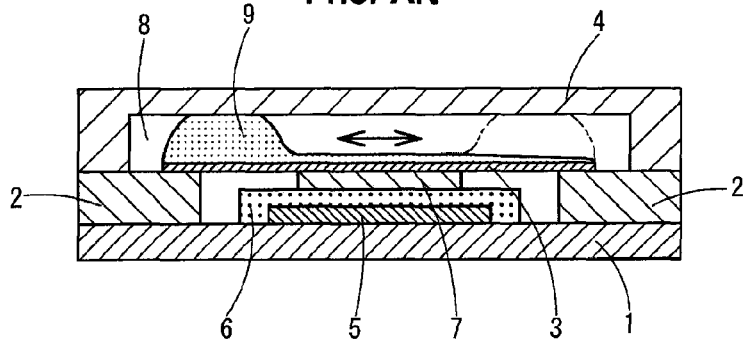
[FIG. 29] It is a longitudinal cross section showing an appearance of a flux of the conventional protection element.

Next, an example of the protection element of this invention and an operating circuit of a secondary battery device employing the element will be described below. In this example, experiments were carried out by constituting a circuit similar to a power circuit employed in an actual secondary battery device. As to a protection element of a conventional structure, shown in FIG. 28, and a protection element having a cylindrical protrusive stripe on the abovementioned insulation cover member of the first embodiment, comparative experiment of their operation was carried out.

A protrusion height of the protrusive stripe meets a condition of Formula 1.

$$B-A \geq C \quad (1)$$

wherein: A denotes a protrusion quantity of a protrusive stripe 20 from an inside top face of an insulation cover member 14; B denotes an interval between a baseboard 11 and the inside top face of the insulation cover member 14; and C denotes a height after blowout of a soluble conductor 13 from the baseboard 11.

A diameter of the protrusive stripe 20 was defined to be 60 to 70% in external diameter and 45 to 55% in internal diameter, assuming that a length of a short side of the soluble conductor 13 of a low-melting metal to which a flux 19 had been applied was defined to be 100%. As the flux 19, the halogen-containing one was employed.

Table 1 shows results obtained by relatively evaluating rates of a blowout time of a structure according to the first embodiment of the invention (the invention 1) while each of MAX, MIN, AVE, and 3σ was defined to be 100% as to the blowout time of a soluble conductor, in a conventional cover plate structure. Experiments were carried out at low-power operations of 5 W and 6 W and at a high-power operation of 35 W, and 50 elements were employed in each of these experiments.

In the experimental results, it was found that a MAX operation time is reduced by 24.5% on average in the case of low-power; dispersion (3σ) is reduced by 66% on average, which is effective in broadening a practical operating power range. In addition, it was observed that the dispersion is reduced at high-power as well.

TABLE 1

Relative comparison of experimental results (N = 50 pcs)

|  |  | Low power | | | | High power | |
|---|---|---|---|---|---|---|---|
|  |  | \multicolumn{6}{c}{Power applied to heating resistor} |
|  |  | 5 W | | 6 W | | 35 W | |
|  |  | \multicolumn{6}{c}{Structure of insulation cover plate} |
|  |  | Prior art | The invention 1 | Prior art | The invention 1 | Prior art | The invention 1 |
| Blowout time of soluble conductor | MAX | 100% | 74% | 100% | 77% | 100% | 93% |
|  | MIN | 100% | 74% | 100% | 105% | 100% | 100% |
|  | AVE | 100% | 99% | 100% | 91% | 100% | 100% |
|  | 3 σ | 100% | 34% | 100% | 34% | 100% | 80% |

EXAMPLE 2

Similarly, table 2 shows results obtained by relatively comparing rates of a blowout time of a structure according to a second embodiment of the invention (the invention 2) while each of MAX, MIN, AVE, and 3σ was defined to be 100%, as to the blowout time of a soluble conductor, in a conventional cover plate structure. A height of a protrusive stripe is equal to that of Example 1. Experiments were carried out at the time of low-power operation of 6 W and at high-power operation of 35 W, and 50 elements were employed in each of the experiments. As a flux, the halogen-containing one was employed.

In the experimental results as well, a MAX operating time was reduced by 14% at low power, and dispersion (3σ) was reduced by 45%.

TABLE 2

Relative comparison of experimental results (N = 50 pcs)

|  |  | Low power | | High power | |
|---|---|---|---|---|---|
|  |  | \multicolumn{4}{c}{Power applied to heating resistor} |
|  |  | 6 W | | 35 W | |
|  |  | \multicolumn{4}{c}{Structure of insulation cover plate} |
|  |  | Prior art | The invention 2 | Prior art | The invention 2 |
| Blowout time of soluble conductor | MAX | 100% | 86% | 100% | 93% |
|  | MIN | 100% | 98% | 100% | 106% |
|  | AVE | 100% | 98% | 100% | 115% |
|  | 3 σ | 100% | 55% | 100% | 90% |

EXAMPLE 3

Similarly, table 3 shows results obtained by relatively comparing rates of a blowout time with one another as to the protection elements having had the structure of the protrusive stripe of the first embodiment of the invention (the invention 1) and the structure shown in FIG. 9 of the above-described embodiments while each of MAX, MIN, AVE, and 3σ was defined to be 100%, as to the blowout time of a soluble conductor, in a conventional cover plate structure. Experiments were carried out at low-power operation of 6 W, and 20 elements were employed in each of the experiments. As a flux, the halogen-free one was employed.

In the experiments, dispersion (3σ) of the blowout time, in a structure in which a protrusive stripe had been provided, became lesser in comparison with that in the conventional structure. In addition, as to the shape of the protrusive stripe, a structure of a cylindrical shape of the first embodiment (the invention 1) showed good results in items of MAX, MIN, AVE, and 3σ as to the blowout time in comparison with a structure of a drum shape of the forth embodiment (FIG. 9). Therefore, in the halogen-free flux, the dispersion of operation in a structure in which a protrusive stripe had been formed on the insulation cover member was lesser in comparison with that in the conventional structure, and in particular, the one having a cylindrically-shaped protrusive stripe had greater effect of reduction of the operating time.

TABLE 3

Relative comparison of experimental results (N = 20 pcs)

|  |  | Power applied to heating resistor | | |
|---|---|---|---|---|
|  |  | \multicolumn{3}{c}{Low power (6 W)} |
|  |  | \multicolumn{3}{c}{Structure of insulation cover plate} |
|  |  | | | Closed loop shape |
|  |  | Prior art | Drum-shape (FIG. 9) | The invention 1 |
| Blowout time of soluble conductor | MAX | 100% | 108% | 66% |
|  | MIN | 100% | 105% | 82% |
|  | AVE | 100% | 102% | 77% |
|  | 3 σ | 100% | 76% | 38% |

EXAMPLE 4

Next, experiments were carried out as to thickness of a baseboard and the blowout performance of a soluble conductor 13, according to the example of this invention. Table 4 shows results obtained by rates of the blowout time in a case where the thickness of the board was 56% of that of the conventional one in the structure (the invention) of the eleventh embodiment of the invention, when the thickness of a conventional general baseboard was assumed to be 100% as to each of MAX, MIN, and AVE.

TABLE 4

|  |  | \multicolumn{4}{c}{Operating electric power} |
|---|---|---|---|---|---|
|  |  | \multicolumn{2}{c}{6 W} | \multicolumn{2}{c}{35 W} |
|  |  | \multicolumn{4}{c}{Structure} |
|  |  | Short-circuit of heating element of conventional board thickness (100%) | Opening one terminal of heating element of board thickness (56%) of the invention | Short-circuit of heating element of conventional board thickness (100%) | Opening one terminal of heating element of board thickness (56%) of the invention |
| Relative comparison [%] | MAX | 100 | 65 | 100 | 70 |
|  | MIN | 100 | 68 | 100 | 57 |

TABLE 4-continued

| | | Operating electric power | | | |
|---|---|---|---|---|---|
| | | 6 W | | 35 W | |
| | | Structure | | | |
| | | Short-circuit of heating element of conventional board thickness (100%) | Opening one terminal of heating element of board thickness (56%) of the invention | Short-circuit of heating element of conventional board thickness (100%) | Opening one terminal of heating element of board thickness (56%) of the invention |
| of blowout time of soldering fuse | AVE | 100 | 69 | 100 | 66 |

Through the experiments, by ensuring that the board thickness is 56% of that of the conventional one, there can be provided a protecting element which is capable of achieving both of reduction of a blowout time to be 30% or more than that of the conventional one and reduction of the height of the protection element.

Further, experiments were carried out as to the board strength and the blowout performance of the soluble conductor 13 in a case where the thickness of a baseboard was variously changed. Table 5 shows results obtained by measuring rates of the blowout time as to the protection element of the structure (the invention) of the eleventh embodiment of the invention while thickness of a conventional general baseboard was defined to be 100%.

TABLE 5

| Conventional board thickness (100%) Board length L: board width: W | Board thickness | Board breakage evaluation (ceramic push-in quantity 1 mm) | Heat capacity (board volume) "where heat capacity of conventional board thickness is 100% | Blowout time of fuse * where blowout time on conventional board thickness is 100% | | Level of effectiveness |
|---|---|---|---|---|---|---|
| | | | | Low power (6 W) | High power (35 W) | |
| L: 1080% Or W: 640% | 45% | Cracked | 43% | — | — | X |
| | 50% | Not cracked | 53% | 65% | 65% | ⊚ |
| | 56% | Not cracked | 58% | 67.50% | 67% | ⊚ |
| | 76% | Not cracked | 77% | 90% | 108% | ○ |
| | 100% | Not cracked | 100% | 100% | 100% | None |

Through the experiments, by ensuring that the board thickness is substantially 50% to 76% of that of the conventional one, both of the strength and blowout time were substantially met, and in particular, it was found preferable to define the board thickness to be substantially 50% to 56% of that of the conventional one.

EXPLANATION OF REFERENCE NUMERALS

| 10 | Protection element |
|---|---|
| 11 | Baseboard |
| 12, 21 | Electrodes |
| 13 | Soluble conductor |
| 14 | Insulation cover member |
| 14a | Interior face |
| 15 | Heating element |
| 16 | Insulation layer |
| 18 | Space |
| 19 | Flux |

-continued

| 20 | Protrusive stripe |
|---|---|
| 20a | Stepped portion |
| 23 | Secondary battery |
| 35 | Overcurrent/overvoltage protection circuit |

The invention claimed is:

1. A protection element comprising:
    a low-melting metal conductor which is provided between a pair of electrodes disposed at both ends of a top face of an insulation baseboard, which is connectable to a power supply path of a device targeted to be protected, and which causes a blowout when a predetermined abnormal electric power amount is supplied;
    an insulation cover member which is mounted on the baseboard, and which covers the low-melting metal conductor with a predetermined space; and
    a flux coated on a surface of the low-melting metal conductor and positioned in the space before the blowout;
    wherein, in a case where the abnormal electric power amount is supplied to the device targeted to be protected, the low-melting metal conductor causes the blowout, and a current path thereof is shut off;
    wherein said protection element further comprises a stepped portion which is formed by a protrusion on an interior face of the insulation cover member opposite to a center part of the low-melting metal conductor, for adhering to and retaining the flux before the blowout such that the flux remains in contact with both a surface of the protrusion and the center part of the low-melting metal conductor by means of surface tension and wettability;

wherein the protrusion comprises a cylindrical protrusive stripe which is formed with a circular stepped portion at a position facing the center part of the low-melting metal conductor; and wherein the insulation cover member is formed in the shape of a box which opens at one side face part thereof, and which is adapted to cover the baseboard with the predetermined space being formed relative to the low-melting metal conductor.

2. The protection element as set forth in claim 1, wherein when the low-melting metal conductor causes the blowout, an end face of the stepped portion at a side of the low-melting metal conductor is provided at a position at which a top part of the blowout low-melting metal conductor does not come into contact.

3. The protection element as set forth in claim 1, further comprising a second protrusion, which is provided opposite to the stepped portion, at an end of the low-melting metal conductor.

4. The protection element as set forth in claim 1, wherein a cutout portion communicating with a space at a back side of the insulation cover member is formed in the protrusive stripe.

5. The protection element as set forth in claim 4, wherein the cutout portion is provided at a position which is symmetrical to a center axis of the insulation cover member.

6. The protection element as set forth in claim 1, wherein:

the low-melting metal conductor is laminated on the baseboard via an insulation layer and a heating element;

the low-melting metal conductor and the heating element are connected between a plurality of electrodes including the pair of electrodes formed on the baseboard; and a number of the electrodes formed on the baseboard is three or less.

7. The protection element as set forth in claim 1, wherein dimensional ratios of a size of the baseboard meet a condition that a length to thickness ratio is 1080%:50 to 78% and a width to thickness ratio is 640%:50 to 78%.

8. The protection element as set forth in claim 7, wherein the dimensional ratios further meet a condition that the width to thickness ratio is 640%:50 to 56%.

9. A secondary battery device, wherein the protection element as set forth in claim 1 is provided in a power supply path of a secondary battery.

10. The protection element as set forth in claim 1, wherein the protrusion comprises two protrusive stripes which are formed in concentric circular shapes on the interior face of the insulation cover member.

* * * * *